United States Patent Office 3,284,289
Patented Nov. 8, 1966

3,284,289
METHOD FOR PROTECTING PLANTS FROM FUNGI
Dieter Duerr, Oetlingerstrasse 1, Basel, Switzerland; Hans Aebi, Baeumlihofstrasse 421, Riehen, Switzerland; and Ludwig Ebner, Gartenstrasse 240, Stein, Aargau, Switzerland
No Drawing. Filed Mar. 5, 1963, Ser. No. 262,863
Claims priority, application Switzerland, Mar. 8, 1962, 2,800/62
10 Claims. (Cl. 167—30)

The present invention provides preparations for combating pests, especially for combating undesired plant growth and harmful micro-organisms, insects, acarids and nematodes, which preparations contain as active substance a compound of the general formula

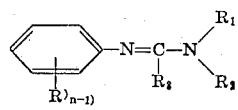
(I)

in which R represents a halogen atom or a lower alkyl, alkoxy or halogenalkyl radical or a phenoxy radical that may be substituted by at least one halogen atom or a lower alkyl, alkoxy or halogen-alkyl radical or represents the group —$CF_3$, —$NO_2$, —CN, —SCN, $n$ represents an integer of a value from 1 to 4, $R_1$ represents an alkyl radical containing 1 to 3 carbon atoms, $R_2$ and $R_3$ are identical or different and represent hydrogen or a lower alkyl group, and the radicals $R_1$ and $R_2$ may together form part of a heterocyclic ring together with the nitrogen atoms, or the salts of these compounds, together with a carrier. The carrier may be a solvent, a diluent, a dispersing agent, a wetting agent or an adhesive and there may also be present a fertilizer or another pesticide.

Among the compounds of the general Formula I, there may be mentioned more especially those in which R represents a halogen atom or a lower alkyl or alkoxy radical, or a phenoxy radical that may be substituted by a halogen atom or a lower alkyl of alkoxy radical or represents the group —$CF_3$ or —$NO_2$, $n$ represents the integer 1 or 2, $R_1$ and $R_2$ represent the methyl or ethyl radical, and $R_3$ represents hydrogen or the methyl radical, or the salts of these compounds. As acids there may be used, for the formation of the salts with the bases set forth above practically any usual inorganic or organic acid, for example MCl, HBr, HJ, HF, $H_2SO_4$, $H_3PO_4$, $HPO_3$, $HNO_3$, $HClO_4$, $HSO_3NH_2$, $CH_3COOH$, $CCl_3COOH$, citric acid, lactic acid, formic acid, oxalic acid, glycollic acid, benzoic acid, oleic acid; 2,3,6-trichloro-benzoic acid, dodecyl benzene sulfonic acid, salicylic acid, nicotinic acid; $CH_3$—$CCL_2$—COOH.

The preparation of the compounds of the general Formula I is advantageously carried out by heating the approriate aryl-isocyanates with an N:N-disubstituted amide of a lower carboxylic acid, for example, dimethyl formamide, N:N-dimethylacetamide, N-formyl- and N-acetyl-pyyrolidine or piperidine. The course of the reaction can easily be followed by the $CO_2$ that is developed.

Instead of the isocyanates, the corresponding carbamic acid chlorides can be used with similar success.

Another method of preparing the compounds of the general Formula I consists in reacting a compound of the general formula

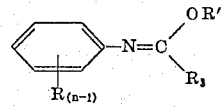

in which R and $n$ have the meaning ascribed to them in the general Formula I, R' represents a lower alkyl group and $R_3$ represents a hydrogen atom or a lower alkyl group, with an amine of the general formula

in which $R_1$ and $R_2$ have the meaning ascribed to them in the general Formula I.

By virtue of the wide scope of their biocidal action, the new products have the special advantage that can be used for combating a very wide variety of vegetable and animal pests.

The compounds of the invention are not only suitable as herbicides; they can also be used in plant protection when applied in a concentration that does not allow a phytotoxic action and are highly effective in combating harmful microorganisms, for example, fungi, such as for example, *Alternaria solani*, *Phytopthora infestans* and *Septoria appii*, and in combating harmful aphids, insects, acarids and nematodes.

Furthermore, the new compounds can also be used as general microbicides, for example, in combating species of Aspergillus, and as insecticides, for example, for combating gnats, flies and the larvae thereof.

When preparing solutions of the compounds of the general Formula I that can be used as such for spraying there may be used as solvents, for example, mineral oil fractions with a high to medium boiling range such as diesel oil or kerosene, coal tar oils and oils of vegetable or animal origin, and hydrocarbons for example alkylated naphthalenes, tetra-hydronaphthalene, if desired, with the use of xylene mixtures, cyclo-hexanols or ketones, and chlorinated hydrocarbons for example trichlorethane, tetrachlorethane, trichloroethylene, trichlorobenzene and tetrachlorobenzene. It is advantageous to use organic solvents having a boiling point above 100° C.

The preparations may also be in the form of emulsion concentrates, pastes or wettable powders, which can be diluted with water to give aqueous spraying liquors. As emulsifiers or dispersing agents there may be used non-ionic products, for example, condensation products of ethylene oxide with aliphatic alcohols, amines or carboxylic acids containing a long-chain hydrocarbon radical of 10 to 20 carbon atoms, for example a condensation product of octadecyl alcohol and 25 to 30 mols of ethylene oxide, or of soya beans fatty acid and 30 mols of ethylene oxide, or of commercial oleylamine and 15 mols of ethylene oxide, or of dodecyl mercaptan and 12 mols of ethylene oxide. As anionic emulsifiers there may be mentioned; the sodium salt of dodecyl alcohol sulfuric acid ester, the sodium salt of dodecyl benzene sulfonic acid, the potassium or triethanolamine salt of oleic acid or of abietic acid or of a mixture of these acids, or the sodium salt of a petroleum sulfonic acid. As cationic dispersing agents there may be mentioned quaternary ammonium compounds, for example cetyl pyridinium bromide or dihydroxyethyl benzyl-dodecyl-ammonium chloride.

Dusting or strewing preparations may contain as solid carriers, talcum, kaolin, bentonite, calcium carbonate or calcium phosphate, or carbon, cork powder, wood meal or other materials of vegetable origin. It is also very advantageous to use the preparations in a granulated form. The various forms of preparations may contain the usual materials that improve their distribution, adhesive power, rain resistance or penetrating power; as such materials there may be mentioned; fatty acids, resins, glue, casein or alginates.

The preparations of the invention can be used either alone or in admixture with the usual pest-combating agents, especially insecticides, acaricides, nematocides, bactericides or other fungicides or herbicides.

The present invention also provides a member selected from the group consisting of (A) a component of the formula

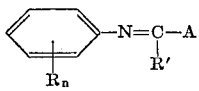

wherein R represents a member selected from the group consisting of the chlorine atom, the bromine atom, a lower alkyl radical, a lower alkoxy radical, a chlorophenoxy radical, the $NO_2$-radical and the $CF_3$-radical, $n$ represents a number of at most 2, R' represents a member selected from the group consisting of the hydrogen atom and the methyl radical, and A represents a member selected from the group consisting of (a) the radical

wherein $R_1$ represents a member selected from the group consisting of the hydrogen atom and a lower alkyl radical, and $R_2$ represents a lower alkyl radical, and (b) a 5 to 7-membered heterocyclic radical containing at most 2 nitrogen atoms and at most 1 oxygen atom, which is attached to the remainder of the molecule by a nitrogen atom, and (B) a salt of a compound set forth above under (A) with an acid.

The following examples illustrate the invention, the parts and percentages being by weight.

EXAMPLE 1

I

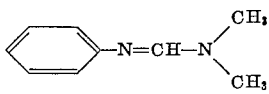

N-phenyl-N':N'-dimethyl-formamidine (a) *Free base.*—100 milliliters of carefully purified dimethylformamide and 50 milliliters of phenylisocyanate were heated under reflux with the exclusion of moisture until the evolution of carbon dioxide was finished. The solution was then fractionated in vacuo. After a first-running of unreacted dimethylformamide, the product distilled at 140° C. under a pressure of 18 millimeters of Hg.

Yield: 39.5 grams.

(b) *Hydrogen sulfate.*—20 grams of the free base obtained as described under I(a) were dissolved in 50 milliliters of absolute alcohol. To this solution were added, dropwise with cooling, 13.5 grams of concentrated sulfuric acid. The resulting crystals were filtered off and washed with ether.

Yield: 26 grams.

Melting point: 169 to 182° C. (recrystallized from absolute alcohol).

*Analysis.*—$C_9H_{14}O_4N_2S$. Calculated: 43.89% C; 5.73% H; 11.38% N. Found: 43.94% C; 5.84% H; 11.28% N.

II

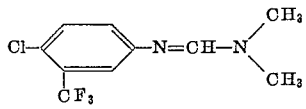

N-3-trifluoromethyl-4-chlorophenyl-N':N'-dimethyl-formamidine (a) *Free base.*—This was prepared from 60 grams of 4-chloro-3-trifluoromethylphenyl-isocyanate and 100 milliliters of dimethylformamide by the method described under I(a). Boiling point: 164° C. at 18 millimeters of Hg.

Yield: 77 grams.

*Analysis.*—$C_{10}H_{10}N_2ClF_3$. Calculated: 47.92% C; 4.02% H; 14.15% Cl. Found: 47.93% C; 4.27% H; 14.40% Cl.

(b) The hydrogen sulfate was prepared from 20 grams of the free base II(a) and 7.9 grams of concentrated sulfuric acid by the method described under I(b). Yield: 21.5 grams, melting point 203 to 205° C. (recrystallized from absolute alcohol).

*Analysis.*—$C_{10}H_{12}O_4N_2ClSF_3$. Calculated: 34.44% C; 3.47% H; 10.17% Cl. Found: 34.69% C; 3.66% H; 9.88% Cl

III

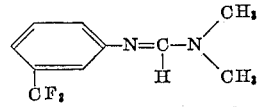

N-3-trifluoromethylphenyl-N':N'-dimethyl-formamidine

*Free base.*—This was prepared from 60 grams of meta-trifluoromethyl-phenylisocyanate and 100 milliliters of dimethylformamide by the method described under I(a). Yield 73 grams. Boiling point: 93 to 95° C. at 0.01 millimeter of Hg.

*Analysis.*—$C_{10}H_{11}N_2F_3$. Calculated: 55.55% C; 5.13% H; 12.9% N. Found: 55.31% C; 5.41% H; 12.82% N.

IV

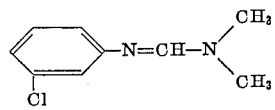

N-3-chlorophenyl-N':N'-dimethyl-formamidine (a) *Free base.*—This was prepared from 60 grams of meta-chlorophenylisocyanate and 100 milliliters of dimethylformamide by the method described under I(a). Yield: 55 grams. Boiling point: 124° C. at 0.05 millimeter of Hg.

*Analysis.*—$C_9H_{11}N_2Cl$. Calculated: 59.18% C; 6.07% H. Found: 58.9% C; 6.2% H.

(b) *Perchlorate.*—This was prepared from 20 grams of the free base IV(a) and 12 milliliters of perchloric acid of 60% strength in absolute alcohol. Melting point: 183 to 185° C. (recrystallized from a mixture of alcohol and ether).

*Analysis.*—$C_9H_{12}O_4N_2Cl_2$. Calculated: 38.18% C; 4.27% H; 25.05% Cl. Found: 38.17% C; 4.25% H; 25.21% Cl.

V

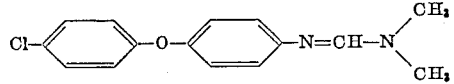

N-para-chlorophenoxyphenyl-N':N'-dimethylformamidine (a) *Free base.*—This was prepared from 60 grams of para-chlorophenoxyphenyl-isocyanate and 100 milliliters of dimethylformamide. Yield: 50 grams. Melting point: 80 to 81.5° C. Boiling point 209° C. at 0.05 millimeter of Hg.

*Analysis.*—$C_{15}H_{15}ON_2Cl$. Calculated: 12.91% Cl. Found: 13.13% Cl.

(b) *Hydrogen sulfate.*—This was prepared from 20 grams of the free base V(a) and 7.2 grams of concentrated sulfuric acid by the method described under I(b). Yield: 21 grams. Melting point: 186 to 194° C. (recrystallized from absolute alcohol).

*Analysis.*—$C_{15}H_{17}O_5N_2ClS$. Calculated: 48.32% C; 4.60% H; 9.51% Cl. Found: 48.6% C; 4.5% H; 9.7% Cl.

VI

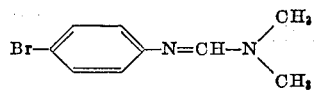

N-para-bromophenyl-N':N'-dimethyl-formamidine

*Free base.*—This was prepared by heating 50 grams of para-bromophenyl-isocyanate with 100 milliliters of dimethylformamide. Yield: 45 grams. Boiling point: 173° C. at 14 millimeters of Hg.

*Analysis.* — C₉H₁₁N₂Br.   Calculated: 47.60% C; 4.88% H; 12.34% N.  Found: 47.3% C; 4.9% H; 12.1% N.

VII

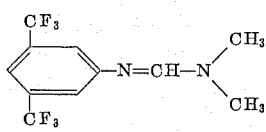

N-3:5-ditrifluoromethylphenyl-N':N'-dimethylformamidine

*Perchlorate.*—This was prepared by heating 50 milliliters of 3:5-ditrifluoromethylphenylisocyanate with 100 milliliters of dimethylformamide until the evolution of gas ceased. The solution was cooled and 22 milliliters of perchloric acid of 60% strength were added dropwise. The product was precipitated with ether. Yield: 70 grams. Melting point: 256 to 261° C. (after recrystallization from a mixture of alcohol and ether).

*Analysis.*—C₁₁H₁₁O₄N₂ClF₆.  Calculated: 34.35% C; 2.88% H; 7.28% N.  Found: 34.37% C; 2.65% H; 7.24% N.

VIII

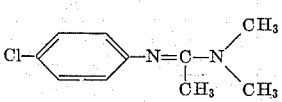

N-para-chlorophenyl-N':N'-dimethyl-acetamidine

*Perchlorate.*—This was prepared by heating 50 grams of para-chlorophenyl-isocyanate with 100 milliliters of N:N-dimethyl-acetamide at 130° C. until the evolution of gas ceased. The solution was cooled and the calculated amount of perchloric acid of 60% strength was added. A total of 29 grams of the desired amidine in the form of perchlorate was precipitated by the addition of ether.

Melting point: 129° C. (after recrystallization from a mixture of alcohol and ether).

*Analysis.* — C₁₀H₁₄O₄N₂Cl₂.  Calculated: 9.43% H.  Found: 9.61% N.

IX

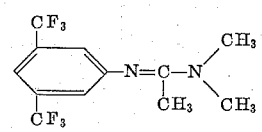

N-3:5-ditrifluoromethylphenyl-N':N'-dimethyl-acetamidine

*Perchlorate.*—This was prepared from 100 milliliters of N:N-dimethyl-acetamide, 50 milliliters of 3:5-ditrifluoromethylphenyl-isocyanate and 21.5 milliliters of perchloric acid of 60% strength by a method analogous to that described under VIII. Yield: 70.5 grams in the form of perchlorate. Melting point: 285 to 288° C. (after recrystallization from a mixture of alcohol and ether).

*Analysis.*—C₁₂H₁₃O₄N₂ClF₃.  Calculated: 36.15% C; 3.29% H; 7.03% N.  Found: 36.25% C; 3.17% H; 7.09% N.

X

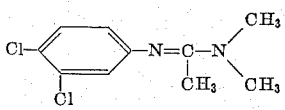

N-3:4-dichlorophenyl-N':N'-dimethyl-acetamidine

*Perchlorate.*—This was prepared from 100 milliliters of N:N-dimethylacetamide, 50 grams of 3:4-dichlorophenyl-isocyanate and 25 milliliters of perchloric acid of 60% strength by a method analogous to that described under VIII. Yield: 21 grams in the form of perchlorate. Melting point: 213 to 221° C. (after recrystallization from alcohol).

*Analysis.* — C₁₀H₁₃N₂Cl₃O₄.  Calculated: 8.45% N.  Found: 8.4% N.

XI

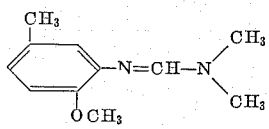

N-2-methoxy-5-methylphenyl-N':N'-dimethylformamidine

*Free base.*—This was prepared from 50 milliliters of 2-methoxy-5-methylphenyl-isocyanate and 75 milliliters of dimethylformamide by the method described under I(*a*). Yield: 43.5 grams. Boiling point: 92 to 95° C. at 0.05 millimeter of Hg.

*Analysis.*—C₁₁H₁₇O₅N₂Cl (perchlorate prepared as described under I(*b*)). Calculated: 45.13% C; 5.85% H; 9.57% N. Found: 45.09% C; 6.09% H; 9.67% N.

The melting point of the perchlorate is 234 to 236.5° C.

XII

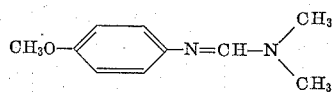

N-para-methoxyphenyl-N':N'-dimethylformamidine

*Free base.*—This was prepared from 50 milliliters of para-methoxyphenylisocyanate and 100 milliliters of dimethylformamide by the method described under I(*a*). Yield: 30 grams. Boiling point: 98° C. at 0.03 millimeter of Hg.

*Perchlorate.*—This was prepared by the method described under I(*b*). Melting point: 171 to 173° C. (after recrystallization from alcohol).

*Analysis* (of the perchlorate).—C₁₀H₁₅O₅N₂Cl. Calculated: 43.09% C; 5.43% H; 10.05% N. Found: 43.3% C; 5.7% H; 10.3% N.

The compounds listed in the following table can be prepared in an analogous manner:

| | Compound | Boiling point, °C./mm. Hg | Analysis (theoretical values in parentheses) | | | |
|---|---|---|---|---|---|---|
| | | | C | H | N | Cl |
| 1 | Cl—⟨Cl-phenyl⟩—N=CH—N(CH₃)₂ | 120–122°/0.15 | | | 12.85(12.90) | 32.51(32.66) |
| 2 | ⟨2,6-dimethylphenyl⟩—N=CH—N(CH₃)₂ | 78–79°/0.05 | 73.76(74.03) | 8.78(8.70) | 17.41(17.27) | |
| 3 | ⟨2-isopropylphenyl⟩—N=CH—N(CH₃)₂ | 91–93°/0.18 | 75.94(75.74) | 9.24(9.54) | 14.72(14.72) | |

| Compound | Boiling point, °C./mm. Hg | Analysis (theoretical values in parentheses) | | | |
|---|---|---|---|---|---|
| | | C | H | N | Cl |
| 4. 4-CH$_3$-3-Cl-C$_6$H$_3$-N=CH-N(CH$_3$)$_2$ | 123–125°/0.01 | 61.5 (61.07) | 7.0 (6.66) | | 18.2 (18.03) |
| 5. 2-Cl-C$_6$H$_4$-N=CH-N(CH$_3$)$_2$ | 120–122°/0.02 | 59.4 (59.18) | 6.3 (6.07) | | 19.2 (19.41) |
| 6. 4-CH$_3$-3-NO$_2$-C$_6$H$_3$-N=CH-N(CH$_3$)$_2$ | 154°/0.1 | 58.03 (57.96) | 6.35 (6.32) | | 20.41 (20.28) |
| 7. 2-Cl-3-CH$_3$-C$_6$H$_3$-N=CH-N(CH$_3$)$_2$ | 94°/0.05 | 60.9 (61.07) | 6.5 (6.66) | | 13.9 (14.24) |
| 8. 4-CH$_3$-3-CH$_3$-C$_6$H$_3$-N=CH-N(CH$_3$)$_2$ | 93–94°/0.05 | 74.70 (74.95) | 9.19 (9.15) | | 15.97 (15.90) |
| 9. 3,4-Cl$_2$-C$_6$H$_3$-N=CH-N(piperidino) | 167°/0.015 | 56.00 (56.05) | 5.38 (5.49) | 10.86 (10.89) | |
| 10. 3,4-Cl$_2$-C$_6$H$_3$-N=CH-N(pyrrolidino) | 163–165°/0.02 | 54.19 (54.34) | 5.06 (4.97) | 11.28 (11.52) | |
| 11. 3,4-Cl$_2$-C$_6$H$_3$-N=CH-N(morpholino) | 152–157°/0.03 | 50.82 (50.98) | 4.69 (4.67) | 10.70 (10.81) | |
| 12. 3-Cl-C$_6$H$_4$-N=CH-N(4-methylpiperazino) | 160–163°/0.18 | | | 17.7 (17.68) | 14.9 (14.91) |
| 13. 3-Cl-4-CF$_3$-C$_6$H$_3$-N=CH-N(hexamethyleneimino) | 143–145°/0.11 | 55.41 (55.18) | 5.35 (5.29) | | 11.57 (11.63) |
| 14. 4-Cl-C$_6$H$_4$-N=CH-N(CH$_3$)$_2$ | 101–103°/0.06 | | | 15.21 (15.34) | 19.63 (19.41) |
| 15. 4-Cl-C$_6$H$_4$-N=CH-N(hexamethyleneimino) | 161–162°/0.04 | 65.42 (65.92) | 7.11 (7.24) | 11.80 (11.83) | 15.50 (14.98) |
| 16. 4-CH$_3$O-3-CH$_3$-C$_6$H$_3$-N=CH-N(CH$_3$)$_2$ | 160–161°/9 | 68.72 (68.72) | 8.54 (8.39) | 14.69 (14.57) | |
| 17. 3-Cl-4-CF$_3$-C$_6$H$_3$-N=CH-N(morpholino) | 140–143°/0.1 | 49.49 (49.24) | 4.34 (4.13) | 9.46 (9.57) | |
| 18. 4-C$_4$H$_9$-C$_6$H$_4$-N=CH-N(CH$_3$)$_2$ | 106°/0.08 | 76.28 (76.42) | 9.91 (9.87) | 13.74 (13.71) | |

EXAMPLE 2

(a) A wettable powder than can be diluted with water to give aqueous spraying liquors and that contains 20% of the active substance of the formula

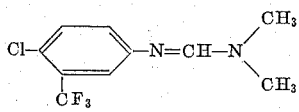

described in Example 1 under II, 75% of kaolin and 5% of lignin sulfonic acid as wetting and dispersing agent was prepared. Another filling agent, for example, talcum or chalk, can also be used instead of kaolin. As wetting and dispersing agents there can also be used other anionic compounds for example lauryl sulfonate or a non-ionic dispersing agent or mixtures thereof. The powder so obtained can be diluted with water as required.

(b) A powder for the prepartion of spraying solutions that contains as active substance the hydrogen sulfate of the compound of the formula

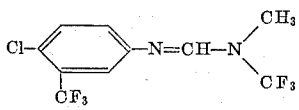

described in Example 1 under II(b) was prepared in the manner described under (a).

(c) 7.5 parts of an emulsifier consisting of a mixture of 3 parts of the calcium or magnesium salt of mono-lauryl-benzene-monosulfonic acid and 7 parts of a polyglycol ether of sorbitan-monolaurate were dissolved in 72.5 parts of butanol. 20 parts of the active substance of the formula

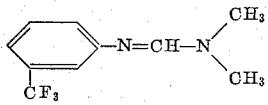

described in Example 1 under III were dissolved in this mixture. An opalescent solution was formed that can be diluted with water as required and that can be used as a spraying solution.

EXAMPLE 3

Seeds of the following plants were sown in flowerpots in a greenhouse: *Setaria italica, Dactylis glomerata, Sinapis alba, Medicago sativa, Lepidium sativum* and *Calendula chrysantha*.

A pre-emergent treatment was carried out 2 days after sowing with a spraying solution prepared as described in Example 2(a) that contained as active substance the compound II(a) of Example 1, or with a spraying solution that contained as active substance the compound II(b) of Example 1, the spray being applied at a rate corresponding to 10 kilograms of active substance per hectare.

Evaluation of the results about 20 days after the treatment showed that, in both cases, the above-mentioned plants were dead or damaped to such an extent (Dactylis) that they could no longer develop normally.

EXAMPLE 4

The experiments were prepared in the manner described in Example 3. However, the post-emergent treatment of the said plants was carried out about 10 days after sowing when the plants had developed the first pair of leaves. The treatment was carried out with sprays prepared as described in Example 2(a) or 2(b) that contained as active substances the compounds described in Example 1 under II(a) or II(b), the sprays being applied at a rate corresponding to 10 kilograms of active substance per hectare. 18 days after the treatment Calendula, Lepidium and Medicago were dead in both cases, whereas Sinapis, Dactylis and Setaria were damaged to such an extent that they could no longer develop normally.

The compounds V(a) and V(b) in Example 1 and the compounds 1, 9 and 18 in the table are distinguished by a specially good herbicidal action.

EXAMPLE 5

(a) Tomato and celery plants were sprayed with a solution prepared as described in Example 2(c) that contained 0.2% of the active substance of the formula

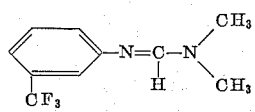

that is described in Example 1 under III.

2 days after the treatment, some of the tomato plants were infected with the spores of *Alternaria solani* and others with the spores of *Phytophthora infestans*. The celery plants were infected with a spore suspension of *Septoria appi*. After the said plants had been infected with the fungi, they were placed in an incubation chamber for two days at a temperature of 22° to 26° C. and at a relative humidity of 95 to 100%. Evaluation of the results (0%=no action; 100%=completely free from fungi attack) showed the following: *Alternaria solani* 100%, *Phytophthora infestans* 97%, *Septoria apii* 95%.

There were virtually no phytotoxic effects to be observed on the treated plants.

The compounds 1, 9, 10 and 11 in the table in Example 1 and compound I in Example 1 are distinguished by a specially good fungicidal action.

EXAMPLE 6

(a) The contact action of compound 18 in the table of Example 1 was tested on the house fly (*Musca domestica*).

The experiments were carried out in the following manner: a 0.01% solution of the said compound in ether was prepared. 1 cubic centimeter of the solution was introduced into the bottom and cover of a Petri dish having a diameter of about 10 centimeters; the solvent was allowed to evaporate. 10 flies were then introduced into the dish, the dish was covered and, after four hours, it was determined how many of the flies could no longer walk and were lying on their backs. The experiment was repeated five times.

The average action on the flies was 97%.

(b) The contact action of compound 18 in the table of Example 1 was tested on the corn weevil (*Calandria granaria*). In this experiment, a 0.001% solution of the active substance in acetone showed a 100% action against *Calandria granaria*.

The ovicidal action of compound 18 in the table of Example 1 was tested on the eggs of the flour moth (*Ephestia kuehniella*). A mixture prepared as described in Example 2c) that contained the said compound showed a 100% ovicidal action against *Ephestia kuehniella* at an active substance concentration of 0.0125%.

What is claimed is:

1. The method for protecting plants from harmful fungi which comprises applying as active principle to the area whereon the said effect is desired, a fungicidal amount of a member selected from the group consisting of (A) a compound of the formula

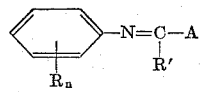

wherein R represents a member selected from the group consisting of the chlorine atom, the bromine atom, lower alkyl, lower alkoxy, chlorophenoxy, $NO_2$— and $CF_3$—, n represents a number of at most 2, R' represents a member selected from the group consisting of the hydrogen atom and methyl, and A represents a member selected from the group consisting of (a) the radical

wherein $R_1$ represents a member selected from the group consisting of the hydrogen atom and lower alkyl, and $R_2$ represents lower alkyl, and (b) a member selected from the group consisting of the radicals

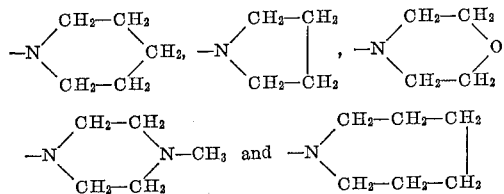

and (B) a salt of a compound set forth above under (A) with an acid selected from the group consisting of HCl, HBr, HI, HF, $H_2SO_4$, $H_3PO_4$, $HPO_3$, $HNO_3$, $HClO_4$, $HSO_3NH_2$, $CH_3COOH$, $CCl_3COOH$, citric acid, lactic acid, formic acid, oxalic acid, glycollic acid, benzoic acid, oleic acid; 2,3,6-trichlorobenzoic acid, dodecyl benzene sulfonic acid, salicylic acid, nicotinic acid; $CH_3—CCl_2—COOH$.

2. A method as claimed in claim 1, wherein there is used as active principle the compound of the formula

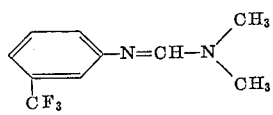

3. A method as claimed in claim 1, wherein there is used as active principle the compound of the formula

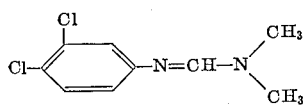

4. A method as claimed in claim 1, wherein there is used as active principle the compound of the formula

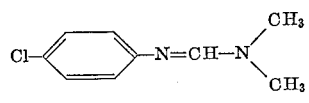

5. A method as claimed in claim 1, wherein there is used as active principle the compound of the formula

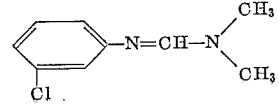

6. A method as claimed in claim 1, wherein there is used as active principle the compound of the formula

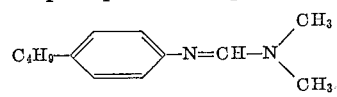

7. A method as claimed in claim 1, wherein there is used as active principle the compound of the formula

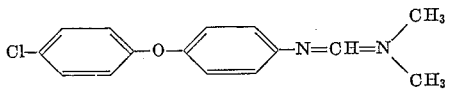

8. A method as claimed in claim 1, wherein there is used as active principle the compound of the formula

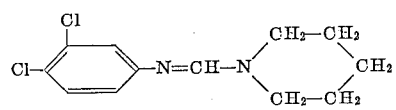

9. A method as claimed in claim 1, wherein there is used as active principle the compound of the formula

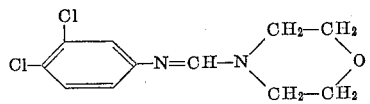

10. A method as claimed in claim 1, wherein there is used as active principle the compound of the formula

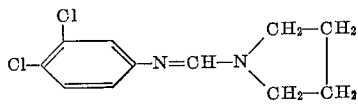

References Cited by the Examiner

UNITED STATES PATENTS

| | | | |
|---|---|---|---|
| 2,845,458 | 7/1958 | Lecher et al. | 260—564 |
| 3,063,821 | 11/1962 | Weil | 71—2.3 |
| 3,072,472 | 1/1963 | Josephs | 71—2.3 |
| 3,073,851 | 1/1963 | Steiger | 260—296 X |
| 3,084,192 | 4/1963 | Smathers | 260—564 |
| 3,119,831 | 1/1964 | Homer | 71—2.5 X |
| 3,164,633 | 1/1965 | Clemens | 71—2.6 |

FOREIGN PATENTS 498,090  1/1939  Great Britain.

OTHER REFERENCES

Hill et al.: J. Am. Chem. Soc., vol. 48, pages 732 to 737 (1926).

Mandel et al.: J. Am. Chem. Soc., 76, pages 3978–82 (1954).

LEWIS GOTTS, *Primary Examiner.*

JULIAN S. LEVITT, *Examiner.*

JAMES O. THOMAS, JR., *Assistant Examiner.*

UNITED STATES PATENT OFFICE
CERTIFICATE OF CORRECTION

Patent No. 3,284,289                          November 8, 1966

Dieter Duerr et al.

It is hereby certified that error appears in the above numbered patent requiring correction and that the said Letters Patent should read as corrected below.

In the heading to the printed specification, lines 4 to 7, for "Dieter Duerr, Oetlingerstrasse 1, Basel, Switzerland; Hans Aebi, Baeumlihofstrasse 421, Riehen, Switzerland; and Ludwig Ebner, Gartenstrasse 240, Stein, Aargau, Switzerland" read -- Dieter Duerr, Basel, Hans Aebi, Riehen, and Ludwig Ebner, Stein, Aargau, Switzerland, assignors to Ciba Limited, Basel, Switzerland, a company of Switzerland --.

Signed and sealed this 6th day of August 1968.

(SEAL)
Attest:

Edward M. Fletcher, Jr.                        EDWARD J. BRENNER
Attesting Officer                              Commissioner of Patents